United States Patent
Masui et al.

(10) Patent No.: US 7,378,454 B2
(45) Date of Patent: *May 27, 2008

(54) POLYURETHANE COMPOSITION AND POLISHING PAD

(75) Inventors: Takashi Masui, Ohtsu (JP); Masahiko Nakamori, Ohtsu (JP); Takatoshi Yamada, Ohtsu (JP); Koichi Ono, Ohtsu (JP); Kazuyuki Ogawa, Osaka (JP); Atsushi Kazuno, Osaka (JP); Hiroshi Seyanagi, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 120 days.

This patent is subject to a terminal disclaimer.

(21) Appl. No.: 10/474,370

(22) PCT Filed: Apr. 4, 2002

(86) PCT No.: PCT/JP02/03369

§ 371 (c)(1),
(2), (4) Date: Oct. 9, 2003

(87) PCT Pub. No.: WO02/083757

PCT Pub. Date: Oct. 24, 2002

(65) Prior Publication Data

US 2004/0157985 A1    Aug. 12, 2004

(30) Foreign Application Priority Data

Apr. 9, 2001 (JP) ............................. 2001-110266
Jul. 9, 2001 (JP) ............................. 2001-208236
Jul. 9, 2001 (JP) ............................. 2001-208261
Oct. 18, 2001 (JP) ............................. 2001-320861

(51) Int. Cl.
*C08G 18/06* (2006.01)

(52) U.S. Cl. ............... 521/137; 521/110; 521/112; 521/130; 521/133; 521/159; 521/170; 521/174; 523/218; 523/219

(58) Field of Classification Search ............... 521/130, 521/131, 133, 170, 174, 110, 112, 137, 159; 523/218, 219
See application file for complete search history.

(56) References Cited

U.S. PATENT DOCUMENTS 3,441,523 A * 4/1969 Dwyer et al. ............... 521/120
3,573,234 A * 3/1971 Archipoff et al. ............. 521/55
3,586,654 A * 6/1971 Lerman et al. ......... 430/137.18
4,008,185 A * 2/1977 Olstowski ................... 521/163
4,374,204 A * 2/1983 Alexandrov et al. .......... 521/28
4,939,184 A * 7/1990 Kennedy .................... 521/170
5,385,953 A * 1/1995 McClellan ............... 521/109.1
5,578,362 A    11/1996 Reinhardt et al.
5,844,013 A * 12/1998 Kenndoff et al. ............ 521/137
6,022,903 A * 2/2000 Younes et al. .............. 521/133
6,043,292 A * 3/2000 Huygens et al. ............ 521/133
6,132,637 A * 10/2000 Hosali et al. .............. 252/79.1
6,166,109 A * 12/2000 Spitler et al. .............. 523/218
6,221,929 B1 * 4/2001 Ryugo et al. .............. 521/114
6,239,188 B1 * 5/2001 Kihara et al. .............. 521/159
6,777,455 B2 * 8/2004 Seyanagi et al. ........... 521/110

FOREIGN PATENT DOCUMENTS

| EP | 0 656 031 B1 | 7/1998 |
| JP | 61-195183 | 8/1986 |
| JP | 1-222868 A | 9/1989 |
| JP | 5-032752 A | 2/1993 |
| JP | 5032752 | 2/1993 |
| JP | 8-500622 A | 1/1996 |
| JP | 8-290356 A | 11/1996 |
| JP | 11-322877 A | 11/1999 |
| JP | 11-322878 A | 11/1999 |
| JP | 3013105 B2 | 2/2000 |
| JP | 2000-71168 A | 3/2000 |
| JP | 2000-330372 | 11/2000 |
| WO | 94/04599 A1 | 3/1994 |
| WO | WO 94/04599 A1 | 3/1994 |

OTHER PUBLICATIONS

Chinese Office Action issued Jun. 10, 2005.
Japanese Office Action mailed on Nov. 15, 2006.
Doi, Toshio. "Details of Semiconductor CMP Technology," Kogyo Chosakai Publishing, Inc. pp. 116-119.

* cited by examiner

*Primary Examiner*—John M. Cooney, Jr.
(74) *Attorney, Agent, or Firm*—Morrison & Foerster LLP

(57) ABSTRACT

A polyurethane composition containing solid beads dispersed therein, is formed of a microcellular polyurethane foam, and the composition has a storage modulus of elasticity at 40° C. of 270 MPa or more as measured by means of a dynamic elasticity measuring device. Another polyurethane composition of this invention contains solid beads dispersed therein, that are capable of swelling with or are soluble in an aqueous medium. The former composition has excellent flattening capability, and the latter composition can provide a polished surface which combines good flatness and good uniformity and can also reduce scratches on the surface.

14 Claims, No Drawings

POLYURETHANE COMPOSITION AND POLISHING PAD

TECHNICAL FIELD

The present invention relates to a polyurethane composition and a method of producing the same. The polyurethane composition of this invention is utilized for various uses such as a polishing pad. The polishing pad can be utilized in flattening processing of materials requiring surface flatness at high level, such as optical materials such as an optical lens and a reflective mirror, a silicon wafer, a glass substrate for a hard disk, an aluminum substrate, and general metal. In particular, the polishing pad of this invention is useful in a process of flattening a silicon wafer or a device having an oxide layer, a metal layer etc. formed on a silicon wafer or a process of flattening a silicon wafer before lamination and formation of an oxide layer and a metal layer.

BACKGROUND ART

Typical materials requiring surface flatness at high level include a single-crystal silicon disk called a silicon wafer for producing semiconductor integrated circuits (IC, LSI). The surface of the silicon wafer should be flattened highly accurately in a process of producing IC. LSI etc., in order to provide reliable semiconductor connections for various coatings used in manufacturing the circuits. In the step of polishing finish, a polishing pad is generally stuck on a rotatable supporting disk called a platen, while a workpiece such as a semiconductor wafer is stuck on a polishing head. By movement of the two, a relative speed is generated between the platen and the polishing head while polishing slurry having abrasive grains is continuously supplied to the polishing pad, to effect polishing processing.

As the polishing pad, foamed polyurethane or the like having a pore structure having a function capable of retaining supplied slurry is used. However, such foamed polyurethane is poor in surface hardness. A polishing pad having hollow fine spheres entrapping high-pressure gas or water-soluble polymer powder dispersed in matrix resin such as polyurethane, as described in Japanese Patent No. 3013105 and JP-A 2000-71168, has been proposed as the polishing pad used in highly accurate polishing. Such a polishing pad secures a pore structure by the hollow fine spheres dispersed in polyurethane, and is endowed with high modulus of elasticity to a certain extent and rendered highly hard by the fine hollow spheres, thus improving flatness (relationship between the difference in level of a convex in a pattern in a device wafer and an abrasion loss of a concave in the pattern by polishing) to a certain extent. For example, IC-1000™ manufactured by Rodel is known as such a polishing pad. The hollow fine spheres can achieve high modulus of elasticity to a certain extent, but does not satisfy sufficient flatness because its effect of achieving high modulus of elasticity is limited due to the presence of the hollow structure. As is also described in a book, Toshiro Dohi et al.: Detailed Semiconductor CMP Techniques (in Japanese), Kogyo Chosakai, page 117 (2000), a hard pad capable of further improving flatness is necessary in consideration of application to elements in the next generation.

Further, a polishing pad having finely foamed or thermally foamed, fine hollow spheres dispersed in polyurethane is also described in JP-A 11-322877, JP-A 11-322878 etc. In particular, JP-A 11-322878 proposes a polishing pad having specific fine hollow spheres of finely foamed or thermally foamed polystyrene dispersed therein. However, such a polishing pad is not endowed with high modulus of elasticity and does not satisfy sufficient flatness.

Accordingly, an object of this invention is to provide a polyurethane composition capable of forming a polishing pad having a pore structure and being excellent in flatness.

For the purpose of improving flatness, a non-foamed hard polishing pad (for example, IC-2000™, manufactured by Rodel) can be used. As shown in the book supra (the same page supra), however, such a hard polishing pad causes the problem of scratches on the polished surface of a workpiece. The non-foamed polishing pad cannot sufficiently retain slurry abrasive grains on the surface of the polishing pad during polishing, and is thus not desirable from the viewpoint of polishing speed.

A polishing pad endowed with high elasticity by dispersing rigid solid beads in place of the hollow fine spheres is anticipated to improve the flatness of the polishing pad. Although flatness is improved by endowing the polishing pad with highly elasticity, the uniformity of a wafer as a whole is deteriorated when such a polishing pad is used. That is, both flatness and uniformity cannot be satisfied by merely dispersing rigid beads such as polystyrene beads. Further, the polishing pad endowed with high elasticity has a serious problem of scratches (scars) of the polished surface of a workpiece.

Use of polyurethane as the matrix resin forming the polishing pad is appreciated as described above. Such polyurethane is produced generally by curing an isocyanate-terminated prepolymer with a chain extender. A chlorine atom-containing chain extender such as 4,4'-methylenebis (o-chloroaniline), which is poor in reactivity and readily regulates curing reaction, is used as the chain extender. However, polyurethane (polishing pad) obtained by using the chlorine atom-containing chain extender as a starting material generates dangerous dioxins upon combustion after use and is thus not capable of thermal recycling (thermal recovery by combustion), thus raising a problem that there is no method for disposal except for landfill disposal.

Accordingly, an object of this invention is to provide a polyurethane composition capable of forming a polishing pad which can satisfy both flatness and uniformity and can reduce scratches. A still other object of this invention is to provide a polyurethane composition being capable of flatness improvement and scratch reduction which cannot be simultaneously achieved by the conventional polishing pad, being capable of thermal recycling of the polishing pad after use, and being not harmful to the environment.

DISCLOSURE OF INVENTION

The present inventors made extensive study for solving the problems described above, and as a result, they found that the objects described above can be achieved by the polyurethane composition shown below.

That is, the present invention relates to a polyurethane composition (1) containing solid beads dispersed in polyurethane, characterized in that the polyurethane is a microcellular polyurethane foam having microcells and the composition has a storage modulus of elasticity at 40° C. of 270 MPa or more as measured by a dynamic viscoelasticity measuring device.

In the polyurethane composition (1) containing solids beads dispersed therein according to this invention, the solids beads are contained as fine spheres in a microcellular polyurethane foam as matrix polymer because the conventional polishing pad using hollow fine spheres dispersed in polyurethane is poor in modulus of elasticity and thus inferior in flatness. The solid beads are beads that are not hollow, and they are effective in increasing the modulus of elasticity of the polyurethane composition by the filler effect of the solid beads dispersed in a microcellular polyurethane foam. The shape of the solid beads is not limited strictly to a bead shape, and they may be bar-shaped fine particles. As a result, the polishing pad using this polyurethane composition can improve the flatness of an intended workpiece.

Because a pore structure cannot be secured when the polyurethane composition (1) contains solid beads dispersed in polyurethane, the microcellular polyurethane foam having microcells, is used as the matrix polymer. The polyurethane is a material excellent in wear resistance and most suitable as a starting material of the polishing pad. Another major aspect of polyurethane is that a polymer having desired physical properties can be obtained by changing the composition of its starting materials, and thus polyurethane is suitable as a material for forming the polishing pad.

Further, the microcellular polyurethane foam serving as the matrix polymer has uniform microcells, and has higher hardness than that of a polyurethane foam having the same density containing microcells that are not uniform. The finely foamed structure of the microcellular polyurethane foam confers high modulus of elasticity on the polyurethane composition, and simultaneously secures a function (pore structure) in retaining slurry supplied to the polishing pad. The finely foamed structure is very effective in retaining slurry abrasive grains in the microcells, to stabilize the polishing speed, and accordingly, the polishing speed is significantly increased and stabilized by the microcells. The microcells possessed by the microcellular polyurethane foam have an average diameter of 70 μm or less, preferably 50 μm or less, still more preferably 40 μm or less. Generally, microcells having an average diameter of 30 to 40 μm are preferable.

The polyurethane composition (1) has storage modulus of elasticity as high as 270 MPa or more at 40° C. When the storage modulus of elasticity of the polyurethane composition is less than 270 MPa, sufficient flattening characteristics are not achieved. The polishing pad using the polyurethane composition having such high modulus of elasticity is not only useful for flatness polishing a wafer for devices, but also useful for use in glass polishing requiring a polishing pad of high modulus of elasticity. The polishing pad can effect polishing stably at high polishing efficiency. The storage modulus of elasticity is preferably 275 MPa or more, more preferably 280 MPa. Although the storage modulus of elasticity is not particularly limited insofar as it is 270 MPa or more, the storage modulus of elasticity is preferably 400 MPa or less, more preferably 350 MPa or less.

The storage modulus of elasticity refers to the storage modulus of elasticity of the polyurethane composition (polyurethane composition containing solid beads dispersed therein) at 40° C. as measured at a frequency of 1 Hz with sinusoidal wave vibration by a tensile test jig in a dynamic viscoelasticity measuring device. The conditions for measuring the storage modulus of elasticity are based on conditions during polishing. That is, it is said that during polishing, the polishing pad is pressed against a workpiece, both of which are rotating, and this movement corresponds to almost 1 Hz, and due to the frictional heat by this movement, the temperature of the polishing pad is increased to about 40° C., and therefore the conditions for measuring the storage modulus of elasticity are accordance with the above conditions. With respect to measurement in a tensile test, the present inventors found that the tensile test and a compression test give almost the same measurement result, and thus the easier tensile test is adopted.

The density of the polyurethane composition (1) is preferably 0.67 to 090 g/cm$^3$.

Even if the filler effect of the solid beads is attained at a lower density of the polyurethane composition (polyurethane containing solid beads dispersed therein), sufficient storage modulus of elasticity tends to be hardly attained, and thus the density of the polyurethane composition is preferably at least 0.67 g/cm$^3$, more preferably at least 0.68 g/cm$^3$. On the other hand, a too high density of the polyurethane composition is not preferable in some cases from the viewpoint of polishing speed because of a shortage of microcells in the surface of the polishing pad produced from the polyurethane composition, and thus the density of the polyurethane composition is preferably not higher than 0.90 g/cm$^3$, more preferably not higher than 0.88 g/cm$^3$.

In the polyurethane composition (1), the microcellular polyurethane foam having microcells preferably contains a silicon surfactant as a foam regulator.

To mix a silicon surfactant as the foam regulator previously with starting materials of polyurethane in production of the microcellular polyurethane foam is advantageous in producing microcells stably, and the microcellular polyurethane foam having fine and uniform cells can be obtained stably without deterioration in the physical characteristics of polyurethane.

Further, this invention relates to a polyurethane composition (2) containing solid beads dispersed in polyurethane, characterized in that the solid beads are capable of swelling with or being soluble in an aqueous medium.

In the polyurethane composition (2) containing solids beads dispersed therein according to this invention, the solids beads are contained as fine spheres in polyurethane as matrix polymer because the conventional polishing pad using hollow fine spheres dispersed in polyurethane is poor in modulus of elasticity and thus inferior in flatness.

The solid beads are beads that are not hollow, and they are effective in increasing the modulus of elasticity of the polyurethane composition by the filler effect of the solid beads dispersed in polyurethane. As a result, the polishing pad using this polyurethane composition can improve the flatness of a workpiece.

Using the solid beads capable of swelling with or being soluble in an aqueous medium, the solid beads only on the surface of the polishing pad swell at the time of polishing, that is, at the time of swelling in the presence of aqueous slurry, resulting in softening the surface of the polishing pad. According to the above effect, flatness and uniformity can be simultaneously satisfied. Because the surface of the polishing pad is thus softened, the problem of scratches on the polished surface can be solved although the polishing pad of high modulus of elasticity is used.

In the polyurethane composition (2), the solid beads may be those capable of swelling with or being soluble in an aqueous medium, and acryl beads are preferably used as the solid beads.

In the polyurethane composition (2), the solid beads may be those capable of swelling with or being soluble in an aqueous medium, and fine cellulose particles are preferably used as the solid beads.

In the polyurethane composition (2), the solid beads used are preferably those having functional groups capable of reacting with polyurethane or starting materials of polyurethane.

When the solid beads used are those having functional groups capable of reacting with polyurethane as the matrix polymer or its materials (starting materials of polyurethane), the affinity of the solid beads for the matrix polymer can be improved to achieve higher modulus of elasticity. Further, the solid beads are swollen with or dissolved in an aqueous medium, and thus the solid beads only on the surface of the polishing pad are swollen or dissolved at the time of polishing, that is, at the time of swelling in the presence of aqueous slurry, resulting in softening the surface of the polishing pad so as to be adjusted to a winding or warping wafer. By using such reactive solid beads, flatness and uniformity can be simultaneously satisfied. By softening the surface of the polishing pad, the problem of scratches on the surface of a workpiece can be solved although the polishing pad of high modulus of elasticity is used.

In the polyurethane composition (2), polyphenol having methylol groups as functional groups can be preferably used as the solid beads (reactive solid beads).

In the polyurethane composition (2), it is preferable that the polyurethane does not contain a chlorine atom as an constituent element, and the solids beads do no contain a chlorine atom as a constituent element.

The polyurethane gives a polymer having desired physical properties by changing the composition of its starting materials, and polyurethane capable of thermal recycling without generation of dangerous dioxins can be obtained by using chlorine atom-free materials as the starting materials (organic polyisocyanate, a polyol compound and a chain extender) of polyurethane. Similarly, a polyurethane composition capable of thermal recycling can be obtained by using solid beads not containing a chlorine atom as an element.

Because a chlorine atom contained as an element in polyurethane is derived generally from a chain extender, polyurethane not containing a chlorine atom as an element can be obtained by using bis-(alkylthio) aromatic amine or the like as the chain extender. For example, JP-A 11-322877 describes that bis-(alkylthio) aromatic amine is used as a chain extender. In JP-A 11-322877, however, the chain extender is used for improving the preservation stability of non-formed, thermally expandable hollow fine spheres, and cannot sufficiently regulate the reaction in production of polyurethane. On the other hand, when the solid beads swelling with or being soluble in an aqueous medium are used as shown in this invention, the curing reaction can be easily regulated due to the action between the solid beads and the starting materials of polyurethane even if the chlorine atom-free chain extender described above is used in the starting materials of polyurethane. The reason for this easy control of the curing reaction is indefinite but estimated as follows: That is, the solid beads are capable of swelling with or being soluble in an aqueous medium, and thus the surfaces of the beads can be said to be hydrophilic, that is, relatively highly polar. Major groups involved in the curing reaction, that is, isocyanate groups and active hydrogen groups, are also highly polar sites. It is therefore estimated that the curing reaction is regulated by the interaction of the surfaces of the beads with isocyanate groups and/or active hydrogen groups.

The polyurethane composition (2) is preferably a microcellular polyurethane foam containing polyurethane having microcells.

The microcellular polyurethane foam having microcells as the matrix polymer can secure a pore structure by its finely foamed structure. The microcellular polyurethane foam has higher hardness than that of polyurethane foam having the same density, having microcells that are not uniform. The finely foamed structure of the microcellular polyurethane foam confers high modulus of elasticity on the polyurethane composition, and simultaneously secures a function (pore structure) in retaining slurry supplied to the polishing pad. The finely foamed structure is very effective in retaining slurry abrasive grains in the microcells to stabilize the polishing speed, thus significantly increasing and stabilizing the polishing speed by the microcells. The microcells possessed by the microcellular polyurethane foam have an average diameter of 70 µm or less, preferably 50 µm or less, still more preferably 40 µm or less. Generally, microcells having an average diameter of 30 to 40 µm are preferable.

Preferably, the polyurethane composition (2) has a storage modulus of elasticity of 270 MPa or more at 40° C. as measured by a dynamic viscoelasticity measuring device.

When the storage modulus of elasticity of the polyurethane composition is 270 MPa or more, sufficient flattening characteristics are achieved. The polishing pad using the polyurethane composition of such high modulus of elasticity is not only useful for flatness polishing a wafer for devices, but also useful for use in glass polishing requiring a polishing pad of high modulus of elasticity. The polishing pad can effect polishing stably at high polishing efficiency. The storage modulus of elasticity is preferably 275 MPa or more, more preferably 280 MPa. Although the storage modulus of elasticity is not particularly limited insofar as it is 270 MPa or more, the storage modulus of elasticity is preferably 400 MPa or less, more preferably 350 MPa or less. The storage modulus of elasticity is as described above.

The density of the polyurethane composition (2) is preferably 0.67 to 090 g/cm$^3$.

Even if the filler effect of the solid beads is attained at a lower density of the polyurethane composition (polyurethane containing solid beads dispersed therein), sufficient storage modulus of elasticity tends to be hardly attained, and thus the density of the polyurethane composition is preferably at least 0.67 g/cm$^3$, more preferably at least 0.68 g/cm$^3$. On the other hand, a too high density of the polyurethane composition is not preferable in some cases from the viewpoint of polishing speed because of a shortage of microcells in the surface of the polishing pad produced from the polyurethane composition, and thus the density of the polyurethane composition is preferably not higher than 0.90 g/cm$^3$, more preferably not higher than 0.88 g/cm$^3$.

In the polyurethane composition (2), the microcellular polyurethane foam having microcells preferably contains a silicon surfactant as a foam regulator. To mix a silicon surfactant as the foam regulator previously with starting materials of polyurethane in production of the microcellular polyurethane foam is advantageous in producing microcells stably, and the microcellular polyurethane foam having fine and uniform cells can be obtained stably without deterioration in the physical characteristics of polyurethane.

Further, this invention relates to a polishing pad formed from the polyurethane composition (2).

Further, this invention relates to a method of producing a microcellular polyurethane foam by mixing a first component containing an isocyanate group-containing compound and a second component containing an active hydrogen group-containing compound, characterized in that solid beads are dispersed in the first component and/or the second component, a silicon nonionic surfactant not having a hydroxyl group is added in an amount of 0.1 to less than 5% by weight based on the total amount of the first and second components, to the first component and/or the second component, the component(s) to which the surfactant was added and an inert gas are stirred to prepare a cellular dispersing liquid having the inert gas dispersed as microcells, and the cellular dispersing liquid is mixed with the remainder of the component and cured to produce the polyurethane composition (1) or (2).

The production method is preferable for production of the polyurethane composition (1) or (2) having a microcellular polyurethane foam having microcells as the matrix polymer and containing solid beads, using a silicon surfactant as a foam regulator.

BEST MODE FOR CARRYING OUT THE INVENTION

In the polyurethane compositions (1) and (2) containing solid beads dispersed therein according to this invention, the polyurethane serving as matrix is formed from an organic polyisocyanate, a polyol compound and a chain extender. When chlorine-free polyurethane is used, the organic polyisocyanate, the polyol compound and the chain extender are those not containing a chlorine atom as an element.

As the organic polyisocyanate, a compound known in the field of polyurethane can be used without particular limitation. The organic polyisocyanate includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and alicyclic diisocyanates such as 1,4-cyclohexane diisocyanate, 4,4'-dicyclohexyl methane diisocyanate, isophorone diisocyanate, hydrogenated m-xylylene diisocyanate and norbornane diisocyanate. These may be used alone or as a mixture of two or more thereof.

As the organic polyisocyanate, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

The polyol compounds include polyol compounds usually used in the technical field of polyurethane. Examples of the polyol compounds include the following high-molecular polyols:

1) Polyether Polyol

The polyether polyol includes, for example, polyoxypropylene polyols obtained by adding propylene oxide to one or more polyvalent alcohols such as ethylene glycol, diethylene glycol, propylene glycol, dipropylene glycol, glycerin and trimethylol propane, polyoxyethylene polyols obtained by adding ethylene oxide to the polyvalent alcohols, polyols obtained by adding butylene oxide or styrene oxide to the polyvalent alcohols, and polytetramethylene ether glycols obtained by adding tetrahydrofuran via ring opening polymerization to the polyvalent alcohols. Copolymers using two or more of the above-mentioned cyclic ethers can also be used.

2) Polyester Polyol

The polyester polyol includes polyols such as polycondensation polymers of one or more kinds of glycols such as ethylene glycol, 1,2-propylene glycol, 1,3-propylene glycol, 1,4-butane diol, 1,5-pentane diol, 1,6-hexane diol, 1,4-cyclohexane dimethanol, neopentyl glycol, 3-methyl-1,5-pentane diol, diethylene glycol, triethylene glycol and 1,4-bis (2-hydroxyethoxy) benzene, and glycerin, trimethylol propane, pentaerythritol or other low-molecular polyvalent alcohols with one or more kinds of carboxylic acids such as glutaric acid, adipic acid, pimelic acid, suberic acid, sebacic acid, terephthalic acid, isophthalic acid, dimer acid, hydrogenated dimer acid or other low-molecular dicarboxylic acids or oligomer acids, or ring-opening polymers of cyclic esters with propiolactone, caprolactone or valerolactone. Typical examples of the polyester polyol include polybutylene adipate and polycaprolactone polyol.

3) Polycarbonate Polyol

The polycarbonate polyol includes polyester polycarbonate polyols exemplified as reaction products of polyester glycol such as polycaprolactone with alkylene carbonate, polyester polycarbonate polyol obtained by reacting ethylene carbonate with a polyvalent alcohol and then reacting the resulting reaction mixture with an organic dicarboxylic acid, and those obtained by ester-exchange reaction of a polyhydroxy compound with aryl carbonate.

4) Acryl Polyol

In the acryl copolymer, use can be made of hydroxyalkyl acrylate such as β-hydroxyethyl acrylate, β-hydroxypropyl acrylate, 3-hydroxypropyl acrylate, β-hydroxybutyl acrylate, 4-hydroxybutyl acrylate and β-hydroxypentyl acrylate, or similar hydroxyalkyl methacrylates, acrylic acid monoesters of polyvalent alcohols such as glycerin, trimethylol propane etc., or similar methacrylic acid monoesters, and acryl polyol having two or more hydroxyl groups in one molecule, such as a copolymerizable monomer such as a monoethylenically unsaturated monomer having hydroxyl groups, such as N-methylol acrylamide or N-methylol methacrylamide.

As the acryl polyol, telechelic acryl polyol can also be used. The telechelic acryl polyol is an acryl polymer containing hydroxyl groups obtained by polymerizing unsaturated monomers containing (meth)acrylate by an organic peroxide-containing initiator in the presence of an alcohol compound and in the presence of an organic sulfonic acid compound. The alcohol compound is an aliphatic or alicyclic alcohol such as methanol, ethanol etc., and when a monofunctional alcohol is used as the alcohol compound, the resulting acryl polymer containing active hydrogen groups is substantially bifunctional, and when diol is used as the alcohol compound, the resulting acryl polymer containing active hydrogen groups is substantially tetrafunctional.

5) Other Polyols

In addition, polymer polyols having polymers such as phenol resin polyol, epoxy polyol, polybutadiene polyol, polyisoprene polyol, polyester-polyether polyol, acrylonitrile and styrene subjected to vinyl addition or dispersed therein, urea-dispersed polyol, polycarbonate polyol etc. can be used as the polyol in this invention. Polyol compounds produced by condensating these polyol compounds with p-aminobenzoic acid to convert active hydrogen groups into aromatic amino groups can also be used.

The number-average molecular weight of the high-molecular polyol is not particularly limited, but is preferably about 500 to 2000 from the viewpoint of the elastic characteristics of the resulting polyurethane. When the number-average molecular weight of the high-molecular polyol is less than 500, the resulting polyurethane is a brittle polymer not having sufficient elastic characteristics, and a polyurethane composition (polishing pad) containing this polyurethane as matrix is too rigid, thus causing scratches on the polished surface of a workpiece polished. Further, such polyurethane is easily worn out and thus not preferable from the viewpoint of the longevity of the polishing pad. On the other hand, when the number-average molecular weight is higher than 2000, a polyurethane composition (polishing pad) containing this polyurethane as matrix may be too soft to be subjected to satisfactory flatting processing.

As the polyol compound, the low-molecular polyols exemplified above as the polyester polyol may be used in combination with the high-molecular polyol described above. These polymer compounds may be used singly or as a mixture thereof.

The chain extender is an organic compound having two or more active hydrogen groups, and examples of such active hydrogen groups include a hydroxyl group, a primary or secondary amino group and a thiol group (SH). The chain extender is a compound having a molecular weight of 500 or less. Specifically, the chain extender includes, for example, the above-described low-molecular polyols, aromatic or alicyclic diamines such as 4,4'-methylenebis(o-chloroaniline), 2,6-dichloro-p-phenylene diamine, 4,4'-methylenebis(2,3-dichloroaniline) and dicyclohexyl methane-4,4'-diamine, and aromatic diols such as 1,4-bishydroxyethoxybenzene (Cuamine H (Ihara Chemical)) and m-xylylene diol (Mitsubishi Gas Chemical). These chain extenders may be used singly or as a mixture of two or more thereof.

Other chain extenders not containing a chlorine atom in the molecule include, for example, bis-(alkylthio) aromatic amines such as 3,5-bis(methylthio)-2,4-toluene diamine and 3,5-bis(methylthio)-2,6-toluene diamine, alkyl aromatic amines such as 3,5-diethyltoluene-2,4-diamine, 3,5-diethyltoluene-2,6-diamine, tetraalkyl diaminodiphenyl methane such as 4,4'-diamino-3,3'-diethyl-5,5'-dimethyl diphenyl methane, and aromatic polyamines such as trimethylene glycol-di-p-aminobenzoate and 1,2-bis(2-aminophenylthio)ethane, and the above-mentioned low-molecular polyols. These may be used alone or as a mixture of two or more thereof.

The proportion of the organic polyisocyanate, the polyol compound and the chain extender in this invention can be changed depending on their respective molecular weights and desired physical properties for use (e.g. a polishing pad) of the polyurethane produced therefrom. To obtain a polishing pad having desired polishing properties, the number of organic isocyanate groups in the organic polyisocyanate, based on the number of total functional groups (number of active hydrogen groups in total such as hydroxyl groups, amino groups etc.) in the polyol compound and the chain extender, is preferably in the range of 0.95 to 1.15, more preferably 0.99 to 1.10. The ratio of the high-molecular component to the low-molecular component in the polyol compound in the polyol compounds is determined depending on the characteristics necessary for the polyurethane produced therefrom.

The polyurethane serving as matrix in the polyurethane composition of this invention can be produced by using urethane production techniques such as a melt method or a solution method, but in consideration of costs and working atmosphere, the polyurethane is produced by the melt method.

In production of the polyurethane, either of a prepolymer method or a one-shot method can be used, but the prepolymer method wherein an isocyanate-terminated prepolymer is previously synthesized from an organic polyisocyanate and a polyol compound and then reacted with a chain extender is preferable because the resulting polyurethane is excellent in physical characteristics. If a commercially available isocyanate-terminated prepolymer produced from an organic polyisocyanate and a polyol compound can be adapted to this invention, it can also be applied to the method of producing polyurethane by the prepolymer method. The isocyanate-terminated prepolymer is preferably the one having a molecular weight of about 800 to 5000 because it is excellent in processability and physical properties.

In production of the polyurethane, a first component containing a isocyanate group-containing compound and a second component containing an active hydrogen group-containing compound are mixed and cured. In the prepolymer method, the isocyanate-terminated prepolymer serves as the isocyanate group-containing compound, and the chain extender (polyol compound if necessary) serves as the active hydrogen group-containing compound. In the one-shot method, the organic polyisocyanate serves as the isocyanate group-containing compound, and the chain extender and the polyol compound serve as the active hydrogen group-containing compound.

In production of the microcellular polyurethane foam, it is preferable to use techniques wherein before or while the polyurethane materials (the first component containing the isocyanate group-containing compound and the second component containing the active hydrogen group-containing compound) are mixed and stirred, a cellular dispersing liquid is produced by introducing inert-gas bubbles into the polyurethane materials, and then cured and foamed to prepare a polyurethane block in a foamed state (preferably in a finely foamed state having fine bubbles). The fine bubbles in the cellular dispersing liquid form fine bubbles in the foam. The characteristics (balance between modulus of elasticity and surface flexibility) of the optimum polishing pad, depending on a material polished or polishing conditions, can be controlled by changing the degree of foaming and fine foaming.

In this process, it is preferable that a foam regulator is added to the polyurethane materials (the first component containing the isocyanate group-containing compound and/or the second component containing the active hydrogen group-containing compound), and after or while the component(s) to which the foam regulator was added is stirred and dispersed together with fine bubbles, the remainder of the components is added. Previous mixing of the foam regulator with the polyurethane materials is a very effective means in stably producing fine bubbles.

The foam regulator is not particularly limited insofar as it can stably forms fine bubbles from the first or second component stirred in the presence of an inert gas. The foam regulator is preferably a silicon-based surfactant. In particular, the silicon-based surfactant used as a foam regulator in the technical field of polyurethane, particularly a silicon-based nonionic surfactant free of an active hydrogen group such as hydroxyl group reacting with an isocyanate group, is used preferably because of good compatibility with the polyol compound and isocyanate prepolymer.

For example, the silicon-based nonionic surfactant is preferably a surfactant made of a silicon-polyether copolymer. The polyether includes, for example, polyethylene oxide, polypropylene oxide and a copolymer thereof. The foam regulator includes, for example, silicon-based nonionic surfactants such as silicon foam regulators SH-190 and SH-192 (Toray Dow Corning Silicone Co., Ltd.), L-5340 (Nippon Unicar Company Limited). The silicon-based nonionic surfactant not having hydroxyl groups gives a microcellular polyurethane foam containing fine and uniform cells without deteriorating the physical properties of polyurethane.

The amount of the foam regulator (silicon-based surfactant) added is preferably 0.1 to 5% by weight based on the materials (total amount of the first component, the second component and solid beads) in the polyurethane composition. When the amount is less than 0.1% by weight, a foam containing fine cells may not be obtained. From this viewpoint, the amount of the foam regulator added is preferably 1% by weight or more. On the other hand, when the amount is higher than 5% by weight, the number of cells in the microcellular polyurethane foam is increased, and a microcellular polyurethane foam of high hardness is hardly obtained. From this viewpoint, the amount of the surfactant added is preferably 5% by weight or less.

The inert gas is a gas composed exclusively of a gaseous component at ordinary temperatures, which does not react with an isocyanate group or an active hydrogen group. The gas may be introduced positively into a solution, or the gas is entrapped naturally during stirring. The inert gas used in forming fine bubbles is preferably incombustible, specifically nitrogen, oxygen, a carbon dioxide gas and a rare gas such as helium or argon, or a mixed gas thereof, and use of air from which moisture was removed by drying is most preferable in respect of costs.

Known stirring device for forming the inert gas into fine bubbles to dispersing the bubbles in the first component and/or the second component can be used without particular limitation, and examples thereof include a homogenizer, a dissolver and a twin-screw planetary mixer. The shape of a stirring blade of the stirring device is not particularly limited, but a whipping stirring blade is used preferably in order to obtain fine bubbles. The conditions for forming fine bubbles are not particularly limited insofar as fine bubbles are formed to give a cured product of predetermined shape, wherein the temperature should be higher than the melting points of the first and second components and lower than a temperature at which the curing reaction of isocyanate groups with active hydrogen groups proceeds rapidly. The temperature is preferably 0 to 140° C., more preferably 10 to 120° C. The curing reaction of the isocyanate groups with the active hydrogen groups is an exothermic reaction, and the degree of heat evolved in the reaction is varied depending on e.g. the type and combination of the selected isocyanate compound and active hydrogen compound, and the temperature is regulated suitably.

Mixing and stirring after addition of the remainder of the components may not be stirring for particularly forming bubbles, and a stirring device not generating large bubbles is preferably used. The stirring device is preferably a planetary mixer. Stirring at the former stage for dispersing fine bubbles and stirring at the latter stage for mixing the remainder of the components added can be conducted successively or simultaneously, and the same stirring device may be used at the former and latter stages. If necessary, the stirring blade can be used while stirring conditions such as rotating speed are changed.

For production of the polyurethane of this invention, a stabilizer such as an antioxidant etc., a surfactant, a lubricant, a pigment, a filler, an antistatic agent and other additives may be added if necessary to the stock solution of polyurethane.

The polyurethane composition of this invention contains solid beads dispersed in polyurethane as the matrix. The method of dispersing solid beads in polyurethane is not particularly limited, but generally the solid beads are dispersed in the stock solution of polyurethane during curing of a mixture of the first and second components.

When the method of polymerizing polyurethane is for example the one-shot method, there is a method of dispersing solid beads in the stock solution of polyurethane by previously mixing the solid beads with the starting materials i.e. the organic polyisocyanate, the polyol compound and the chain extender or by mixing the solid beads with the starting materials and then dispersing them until polyurethane is cured. When the method of polymerization is the prepolymer method, there is a method of previously mixing the solid beads with the isocyanate-terminated prepolymer or the chain extender or by mixing the solid beads with the isocyanate-terminated prepolymer and the chain extender and dispersing them until polyurethane is cured.

The solid beads used in the polyurethane composition (1) can be either an organic or inorganic material without particular limitation to its material, but from the viewpoint of dispersibility in polyurethane, an organic polymeric material is preferable. However, solid beads made of hard materials are more preferable than elastic beads made of acryl rubber, polyurethane etc. because of the necessity for endowing polyurethane with high modulus of elasticity by the filler effect. For example, those having a hardness (Shore D hardness) of 70 or more are preferable. Examples of materials for the solids beads include polystyrene, polyamide, polymethyl methacrylate (PMMA), polyphenol, polyethylene, melamine resin, epoxy resin, polyphenol, polyvinyl alcohol, polyvinyl pyrrolidone, polyacrylic acid, polyethylene glycol, cellulose, partially hydrolyzed polyacrylate, etc. These materials for the solid beads can be a copolymer of the above materials or have a sheath/core multi-layer structure.

The solid beads used in the polyurethane composition (2) are those comprising a hygroscopic polymeric material swollen with or dissolved in an aqueous medium. The polymeric material includes polyvinyl alcohol, polyvinyl pyrrolidone, polyacrylic acid, polyethylene glycol, cellulose, partially hydrolyzed polyacrylate etc. Further, products endowed with hygroscopic properties, produced by copolymerizing these materials with non-hygroscopic materials such as polystyrene, can also be used. The aqueous medium refers to water or an aqueous acidic or basic solution.

The hygroscopic solid beads swollen with or dissolved in the aqueous medium are preferably acryl beads or fine cellulose particles, from the viewpoint of improvement of the modulus of elasticity of polyurethane by the filler effect and swelling at the time of swelling. In particular, fine cellulose particles are preferable. The hygroscopic acryl beads include, for example, HU-720P manufactured by Nippon Exran.

The hygroscopic solid beads are preferably reactive solid beads. The reactive solid beads are made of a polymeric material having reactive groups capable of reacting with polyurethane or the polyurethane materials and capable of swelling with or being soluble in an aqueous medium. The functional groups capable of reacting with polyurethane or the polyurethane materials include an isocyanate group, amino group, hydroxyl group, phenol group, carboxyl group, thiol group etc. The polymeric material having these functional groups and capable of swelling with or being soluble in an aqueous medium includes, for example, polyphenol, polyvinyl alcohol, polyvinyl pyrrolidone, polyacrylic acid, polyethylene glycol, cellulose etc. Products endowed with swelling properties or solubility, produced by copolymerizing these polymeric materials with hydrophobic materials such as polystyrene, can also be used. Examples of the reactive solid beads include, for example, Bellpearl R type (phenol beads having methylol groups) manufactured by Kanebo, Ltd.

The particle diameter of the solid beads is not particularly limited, but from the viewpoint of attaining a higher degree of modulus of elasticity and handling for dispersing them in polyurethane, the particle diameter is preferably in the range of about 0.1 to 100 μm.

The content of the solid beads is preferably about 1 to 40% by weight relative to the polyurethane composition (polyurethane containing the solid beads dispersed therein). For attaining a higher degree of modulus of elasticity, the content of the solid beads is preferably 3% by weight or more. For sufficiently dispersing the solid beads in polyurethane, the content of the solid beads is more preferably 25% by weight or less. The content of the solid beads is preferably in the range of 3 to 25% by weight.

Production of the polyurethane composition in this invention is conducted by injecting a mixture of the polyurethane materials and the solid beads into a mold, curing the mixture until it loses fluidity, and forming the mixture, according to the above-described method of producing polyurethane. A polyurethane block (polyurethane composition) containing the solid beads dispersed therein is thus obtained.

The resulting polyurethane block can be heated and post-cured, and such procedures have an effect of improving the physical properties of polyurethane, and are very preferable. The curing reaction is conducted preferably at normal pressures to stabilize the shape of bubbles. In production of the polyurethane composition, a catalyst promoting the polyurethane reaction may also be used. The type and amount of the catalyst can be suitably determined. The polyurethane composition in this invention may be produced either in a batch system wherein the respective components in the stock solution of polyurethane are metered and introduced into a vessel, and the mixed solution is stirred, or in a continuous production system wherein the respective components of the stock solution of polyurethane and an inert gas are continuously supplied and stirred with a stirring device, while the mixed solution is removed to produce molded products.

The resulting polyurethane composition is sliced in thickness suitable for the polishing pad. The polyurethane composition may be produced by pouring the polyurethane component into a mold having a cavity having the same thickness as that of the intended polishing pad. The thickness of the polishing pad is usually 0.8 mm to 2 mm, and usually a sheet having a thickness of about 1.2 mm is used.

The surface of the polishing pad can be provided with grooves, or a flexible porous sheet etc. can be stuck on the backside thereof. The grooves on the surface of the polishing pad have an action in removing abraded dusts and abrasive grains from the contact area between the polishing sheet and a material to be polished. The shape of grooves is not particularly limited, and its section is rectangular, triangular, U-shaped and semicircular, and may have a sectional area through which fine powders pass. The grooves are arranged in a concentric circle form, a latticed form etc. on the sheet. The depth of the grooves, though being varied depending on the thickness of the sheet, is about 0.4 to 0.8 mm.

EXAMPLES

Hereinafter, the present invention is described by reference to the Examples, but this invention is not limited to these examples.

Example 1

(Formation of Polyurethane Composition (1))

500 parts by weight of a polyether prepolymer (Adiprene L-325; isocyanate group concentration 2.22 meq/g, manufactured by Uniroyal), 34 parts by weight of styrene/acryl crosslinked beads (Microgel MG-351, average particle diameter 1 μm, Nippon Paint Co., Ltd.), and 20 parts by weight of a silicon surfactant (SH-192, Toray Dow Corning Silicone Co., Ltd.) were introduced into a vessel, mixed and defoamed under reduced pressure at a temperature regulated at 80° C. Then, the mixture was stirred so vigorously as to incorporate bubbles, and 145 parts by weight of 4,4'-methylenebis(o-chloroaniline) previously melted at 120° C. were added thereto to give a mixed solution. The mixed solution was stirred for about 1 minute, introduced into a pan-type open mold and post-cured for 6 hours in an oven at 110° C., to give a polyurethane finely foamed block (cell diameter 40 μm) containing styrene/acryl crosslinked beads dispersed therein. The density of the polyurethane finely foamed block was 0.88 g/cm$^3$. Measurement of the density was carried out according to JIS K 7222 (Foamed Plastics, Rubber, and Measurement of Apparent Density).

(Measurement of Storage Modulus of Elasticity)

Then, the polyurethane finely foamed block was sliced in a thickness of 1.27 mm under heating at about 50° C. by a slicer (VGW-125, manufactured by Amiteck), to give a polishing sheet. A 5 mm wide rectangular sheet was cut off from the polishing sheet and measured, to indicate that its storage modulus of elasticity was 295 MPa.

This storage modulus of elasticity was measured at a frequency of 1 Hz with sinusoidal wave vibrations by a tensile test jig with a dynamic viscoelasticity measuring device Rheogel-E4000 (manufactured by UBM). Measurement at −20° C. to 80° C. was conducted in a temperature-depending mode, and the storage modulus of elasticity at 40° C. was used.

(Preparation and Evaluation of a Polishing Pad)

A double-coated tape (Double Tack Tape #5782, manufactured by Sekisui Chemical Co., Ltd.) was stuck on the resulting polishing sheet to complete a polishing pad. The resulting polishing pad was evaluated in polishing characteristics by a CMP polishing device (SPP-600S, manufactured by Okamoto Kosaku Kikai). Using the polishing pad rotating at 35 rpm, a wafer rotating at 33 rpm was polished with silica slurry (RD97001, manufactured by Fujimi Incorporated) adjusted to pH 11 at a flow rate of 150 g/min. under a polishing loading of 350 g/cm$^2$.

(Flatness)

For evaluation of flatness, a thermally oxidized 0.5 μm coating was deposited on a 6 inch silicon wafer and then subjected to patterning at L/S (line and space)=25 μm/5 μm and L/S=5 μm/25 μm. and an oxidized coating (TEOS) was further deposited in a thickness of 1 μm thereon to prepare a patterned wafer having an initial difference of 0.5 μm in level. This wafer was polished under the above-described polishing conditions, and when the difference in global level was reduced to 200 nm or less, an abrasion loss in the bottom of 25 μm space was measured to evaluate the flatness. The flatness was 70 nm. A lower value of flatness indicates higher performance.

(Average Polishing Speed)

In evaluation of average polishing speed, a thermally oxidized 1 μm coating deposited on a 6 inch silicon wafer was polished under the polishing conditions described above, and the average polishing speed when the coating was polished by 0.5 μm was determined. The average polishing speed was 110 nm/min. A higher average polishing speed indicates higher performance.

Example 2

A polyurethane finely foamed block (cell diameter 35 μm) was obtained in the same manner as in Example 1 except that the amount of the styrene/acryl crosslinked beads used was changed to 72 parts by weight, and the amount of the silicon surfactant used was changed to 30 parts by weight. The density of the resulting polyurethane finely foamed block was 0.76 g/cm$^3$. A polishing sheet and a polishing pad were prepared in the same manner as in Example 1 and evaluated in polishing. The modulus of elasticity of the resulting polishing sheet was 278 MPa. The measured flatness and average polishing speed of the resulting polishing pad are shown in Table 1.

Example 3

A polyurethane finely foamed block (cell diameter 30 μm) was obtained in the same manner as in Example 1 except that the amount of the styrene/acryl crosslinked beads used was changed to 161 parts by weight, and the amount of the silicon surfactant used was changed to 40 parts by weight. The density of the resulting polyurethane finely foamed block was 0.69 g/cm$^3$. A polishing sheet and a polishing pad were prepared in the same manner as in Example 1 and evaluated in polishing. The modulus of elasticity of the resulting polishing sheet was 271 MPa. The measured flatness and average polishing speed of the resulting polishing pad are shown in Table 1.

Example 4

A polyurethane finely foamed block (cell diameter 30 μm) was obtained in the same manner as in Example 1 except that 34 parts by weight of crosslinked methyl polymethacrylate beads (Techpolymer MBX-15, particle diameter 15 μm, Sekisui Chemical Co., Ltd.) were used in place of 34 parts by weight of the styrene/acryl crosslinked beads. The density of the resulting polyurethane finely foamed block was 0.80 g/cm$^3$. A polishing sheet and a polishing pad were prepared in the same manner as in Example 1 and evaluated in polishing. The modulus of elasticity of the resulting polishing sheet was 280 MPa. The measured flatness and average polishing speed of the resulting polishing pad are shown in Table 1.

Comparative Example 1

500 parts by weight of a polyether prepolymer (Adiprene L-325; isocyanate group concentration 2.22 meq/g, manufactured by Uniroyal) and 13 parts by weight of Expancell 551DE (fine hollow spheres consisting of a vinylidene chloride/acrylonitrile copolymer, manufactured by Nippon Ferrite) were mixed in a vessel and defoamed under reduced pressure. Then, 145 parts by weight of 4,4'-methylenebis(o-chloroaniline) previously melted at 120° C. was added thereto to give a mixed solution. The mixed solution was stirred for about 1 minute, introduced into a pan-type open mold and post-cured for 6 hours in an oven at 110° C., to give a polyurethane finely foamed block (cell diameter 40 μm). The density of the polyurethane finely foamed block was 0.75 g/cm$^3$.

A polishing sheet and a polishing pad were prepared in the same manner as in Example 1 and evaluated in polishing. The modulus of elasticity of the resulting polishing sheet was 268 MPa. The measured flatness and average polishing speed of the resulting polishing pad are shown in Table 1.

Comparative Example 2

A polyurethane finely foamed block (cell diameter 30 μm) was obtained in the same manner as in Example 1 except that the amount of the silicon surfactant used was changed to 80 parts by weight. The density of the resulting polyurethane finely foamed block was 0.66 g/cm$^3$. A polishing sheet and a polishing pad were prepared in the same manner as in Example 1 and evaluated in polishing. The modulus of elasticity of the resulting polishing sheet was 210 MPa. The measured flatness and average polishing speed of the resulting polishing pad are shown in Table 1.

TABLE 1

|  | Density (g/cm$^3$) | Storage modulus of elasticity (MPa) | Flatness (nm) | Average polishing speed (nm/min) |
| --- | --- | --- | --- | --- |
| Example 1 | 0.88 | 296 | 70 | 110 |
| Example 2 | 0.76 | 278 | 85 | 120 |
| Example 3 | 0.69 | 271 | 90 | 125 |
| Example 4 | 0.80 | 280 | 80 | 120 |
| Comparative Example 1 | 0.75 | 268 | 100 | 115 |
| Comparative Example 2 | 0.66 | 210 | 130 | 120 |

As is evident from Table 1, the polishing pads obtained from the polyurethane composition (1) of this invention are excellent in flatness, and the polishing speed is also satisfactory. This is probably because the polishing pads of this invention are made of a highly elastic microcellular polyurethane foam having density in the specific range.

Example 5

(Formation of Polyurethane Composition (2): Example using hygroscopic Solid Beads)

500 parts by weight of a polyether prepolymer (Adiprene L-325; isocyanate group concentration 2.22 meq/g, manufactured by Uniroyal), 34 parts by weight of hygroscopic acryl solid beads (HU-720P, average particle diameter 50 μm, manufactured by Nippon Exran), and 19 parts by weight of a silicon surfactant (SH-192, manufactured by Toray Dow Corning Silicone Co., Ltd.) were introduced into a vessel, mixed and defoamed under reduced pressure at a temperature regulated at 80° C. Then, the mixture was stirred so vigorously as to incorporate bubbles, and 145 parts by weight of 4,4'-methylenebis(o-chloroaniline) previously melted at 120° C. was added thereto. The mixed solution was stirred for about 1 minute, introduced into a pan-type open mold and post-cured for 6 hours in an oven at 110° C., to give a polyurethane finely foamed block (cell diameter 40 μm). The density of the polyurethane finely foamed block was 0.79 g/cm$^3$.

A polishing sheet and a polishing pad were prepared in the same manner as in Example 1 and evaluated in polishing. The modulus of elasticity of the resulting polishing sheet was 292 MPa. The measured flatness, uniformity in surface, and average polishing speed of the resulting polishing pad are shown in Table 2. The uniformity in surface was measured by the following method.

(Uniformity in Surface)

For evaluation of uniformity in surface, a thermally oxidized 1 μm coating deposited on a 6 inch silicon wafer was polished under the polishing conditions described above until the thickness of the thermally oxidized coating was reduced to 0.5 μm, and its flatness was evaluated, and then the thickness at 28 points of the coating on the wafer were measured. The uniformity in surface, as determined from the following equation, was 7.0%. A lower value of uniformity in surface indicates higher uniformity.

Uniformity in surface (%)={(maximum coating thickness−minimum coating thickness)/(2×average coating thickness)}×100

Example 6

A polyurethane finely foamed block (cell diameter 40 μm) was obtained in the same manner as in Example 5 except that the hygroscopic acryl solid beads HU-720P were used in an amount of 72 parts by weight. The density of the resulting polyurethane finely foamed block was 0.75 g/cm³. A polishing sheet and a polishing pad were prepared in the same manner as in Example 5 and evaluated in polishing. The modulus of elasticity of the resulting polishing sheet was 274 MPa. The measured flatness, uniformity in surface and average polishing speed of the resulting polishing pad are shown in Table 2.

Example 7

A polyurethane finely foamed block (cell diameter 40 μm) was obtained in the same manner as in Example 5 except that the hygroscopic acryl solid beads HU-720P were used in an amount of 161 parts by weight. The density of the resulting polyurethane finely foamed block was 0.73 g/cm³. A polishing sheet and a polishing pad were prepared in the same manner as in Example 5 and evaluated in polishing. The modulus of elasticity of the resulting polishing sheet was 281 MPa. The measured flatness, uniformity in surface and average polishing speed of the resulting polishing pad are shown in Table 2.

Example 8

A polyurethane finely foamed block (cell diameter 30 μm) was obtained in the same manner as in Example 5 except that 34 parts by weight of fine cellulose particles (Avicel, particle diameter 20 to 100 μm, manufactured by Merck) were used in place of 34 parts by weight of the hygroscopic acryl solid beads HU-720P. The density of the resulting polyurethane finely foamed block was 0.80 g/cm³. A polishing sheet and a polishing pad were prepared in the same manner as in Example 5 and evaluated in polishing. The modulus of elasticity of the resulting polishing sheet was 288 MPa. The measured flatness, uniformity in surface and average polishing speed of the resulting polishing pad are shown in Table 2.

Reference Example 1

A polyurethane finely foamed block (cell diameter 40 μm) was obtained in the same manner as in Example 5 except that the silicon surfactant SH-192 was used in an amount of 80 parts by weight. The density of the resulting polyurethane finely foamed block was 0.70 g/cm³. A polishing sheet and a polishing pad were prepared in the same manner as in Example 5 and evaluated in polishing. The modulus of elasticity of the resulting polishing sheet was 235 MPa. The measured flatness, uniformity in surface and average polishing speed of the resulting polishing pad are shown in Table 2. The result of evaluation of the polishing pad obtained in Comparative Example 1 is also shown in Table 2.

TABLE 2

| | Density (g/cm³) | Storage modulus of elasticity (MPa) | Flatness (nm) | Uniformity in surface (%) | Average polishing speed (nm/min) |
|---|---|---|---|---|---|
| Example 5 | 0.79 | 292 | 70 | 7.0 | 120 |
| Example 6 | 0.75 | 274 | 90 | 4.5 | 135 |
| Example 7 | 0.73 | 281 | 80 | 4.5 | 135 |
| Example 8 | 0.80 | 294 | 75 | 6.0 | 120 |
| Comparative Example 1 | 0.75 | 268 | 100 | 8.0 | 115 |
| Reference Example 1 | 0.70 | 235 | 125 | 6.0 | 120 |

As is evident from Table 2, the polishing pads obtained according to this invention satisfy both flatness and uniformity in surface. This is probably because the polishing pads of this invention are highly elastic, while at the time of polishing, that is, at the time of wetting, the surfaces only of the polishing pads are softened.

Example 9

(Formation of Polyurethane Composition (2): Example using Reactive Solid Beads)

500 parts by weight of a polyether prepolymer (Adiprene L-325; isocyanate group concentration 2.22 meq/g, manufactured by Uniroyal), 34 parts by weight of reactive phenol solid beads (R-800, average particle diameter 20 μm, manufactured by Kanebo, Ltd.), and 20 parts by weight of a silicon surfactant (SH-192, manufactured by Toray Dow Corning Silicone Co., Ltd.) were introduced into a vessel, mixed and defoamed under reduced pressure at a temperature regulated at 80° C. Then, the mixture was stirred so vigorously as to incorporate bubbles, and 145 parts by weight of 4,4'-methylenebis(o-chloroaniline) previously melted at 120° C. was added thereto to give a mixed solution. The mixed solution was stirred for about 1 minute, introduced into a pan-type open mold and post-cured for 6 hours in an oven at 110° C., to give a polyurethane finely foamed block (cell diameter 35 μm) containing styrene/acryl crosslinked beads dispersed therein. The density of the polyurethane finely foamed block was 0.76 g/cm³.

A polishing sheet and a polishing pad were prepared in the same manner as in Example 1 and evaluated in polishing. The modulus of elasticity of the resulting polishing sheet was 270 MPa. The measured flatness, uniformity in surface, average polishing speed and scratch of the resulting polishing pad are shown in Table 3. The scratch was measured by the following method.

(Scratch)

For evaluation of scratches, a thermally oxidized 1 μm coating deposited on a 6 inch silicon wafer was polished until the thickness of the thermally oxidized coating was reduced to 0.5 μm under the above described polishing conditions, and then the wafer was washed and dried, and examined for micro-scratches generated per wafer by KLA (KLA2112, manufactured by KLA Tencall), indicating that the number of micro-scratches per wafer was 22. A smaller number of scratches indicates higher performance.

Example 10

A polyurethane finely foamed block (cell diameter 40 μm) was obtained in the same manner as in Example 9 except that the amount of the reactive phenol solid beads used was changed into 72 parts by weight. The density of the resulting polyurethane finely foamed block was 0.75 g/cm$^3$. A polishing sheet and a polishing pad were prepared in the same manner as in Example 9 and evaluated in polishing. The modulus of elasticity of the resulting polishing sheet was 279 MPa. The measured flatness, uniformity in surface, average polishing speed and scratch of the resulting polishing pad are shown in Table 3.

Example 11

A polyurethane finely foamed block (cell diameter 40 μm) was obtained in the same manner as in Example 9 except that the amount of the reactive phenol solid beads used was changed into 161 parts by weight. The density of the resulting polyurethane finely foamed block was 0.71 g/cm$^3$. A polishing sheet and a polishing pad were prepared in the same manner as in Example 9 and evaluated in polishing. The modulus of elasticity of the resulting polishing sheet was 277 MPa. The measured flatness, uniformity in surface, average polishing speed and scratch of the resulting polishing pad are shown in Table 3.

Reference Example 2

A polyurethane finely foamed block (cell diameter 40 μm) was obtained in the same manner as in Example 1 except that in Example 9, 34 parts by weight of polystyrene solid beads (SBX-17, average particle diameter 17 μm, manufactured by Sekisui Chemical Co., Ltd.) were used in place of the reactive phenol solid beads. The density of the resulting polyurethane finely foamed block was 0.77 g/cm$^3$. A polishing sheet and a polishing pad were prepared in the same manner as in Example 1 and evaluated in polishing. The modulus of elasticity of the resulting polishing sheet was 288 MPa. The measured flatness, uniformity in surface, average polishing speed and scratch of the resulting polishing pad are shown in Table 3.

The result of evaluation of the polishing pad obtained in Comparative Example 1 is also shown in Table 3.

TABLE 3

| | Density (g/cm$^3$) | Storage modulus of elasticity (MPa) | Flatness (nm) | Uniformity in surface | Average polishing speed (nm/min) | Scratches (number/wafer) |
|---|---|---|---|---|---|---|
| Example 9 | 0.76 | 270 | 90 | 7.5 | 115 | 22 |
| Example 10 | 0.75 | 279 | 80 | 8.5 | 120 | 29 |
| Example 11 | 0.71 | 277 | 80 | 8.0 | 120 | 38 |
| Comparative Example 1 | 0.75 | 268 | 100 | 8.0 | 115 | 90 |
| Reference Example 2 | 0.77 | 288 | 75 | 9.5 | 115 | 120 |

As is evident from Table 3, the polishing pads obtained according to this invention satisfy both flatness and uniformity in surface with less scratch. This is probably because the polishing pads of this invention are highly elastic, while at the time of polishing, that is, at the time of wetting, the surfaces only of the polishing pads are softened.

Example 12

(Formation of Polyurethane Composition (2): Example not Containing Chlorine)

450 parts by weight of a polyether prepolymer (Adiprene L-325; isocyanate group concentration 2.22 meq/g, manufactured by Uniroyal), 61 parts by weight of fine cellulose particles (Avicel, particle diameter 20 to 100 μm, manufactured by Merck) and 18 parts by weight of a silicon surfactant (SH-192, manufactured by Toray Dow Corning Silicone Co., Ltd.) were introduced into a vessel, mixed and defoamed under reduced pressure at a temperature regulated at 60° C. Then, the mixture was stirred so vigorously as to incorporate bubbles, and 103 parts by weight of 3,5-bis (methylthio)-2,4-toluenediamine/3,5-bis(methylthio)-2,6-toluenediamine mixture (ETHACURE-300™, mixing ratio 80/20, manufactured by Alubemal Asano) were added thereto and stirred for about 1 minute, and the mixed solution was introduced into a pan-type open mold and post-cured for 6 hours in an oven at 110° C., to give a polyurethane finely foamed block (cell diameter 40 μm) containing fine cellulose particles dispersed therein. The density of the polyurethane finely foamed block was 0.77 g/cm$^3$.

A polishing sheet and a polishing pad were prepared in the same manner as in Example 1 and evaluated in polishing. The modulus of elasticity of the resulting polishing sheet was 305 MPa. The measured flatness, average polishing speed and scratch of the resulting polishing pad are shown in Table 4.

Example 13

A polyurethane finely foamed block (cell diameter 40 μm) was obtained in the same manner as in Example 12 except that the amount of the fine cellulose particles was changed into 138 parts by weight. The density of the resulting polyurethane finely foamed block was 0.74 g/cm$^3$. A polishing sheet and a polishing pad were prepared in the same manner as in Example 1 and evaluated in polishing. The modulus of elasticity of the resulting polishing sheet was 330 MPa. The measured flatness, polishing speed and scratch of the resulting polishing pad are shown in Table 4.

Example 14

A polyurethane finely foamed block (cell diameter 40 μm) was obtained in the same manner as in Example 12 except that 61 parts by weight of KC Flock W-400G (particle diameter of 24 μm or less, manufactured by Nippon Seishi) were used as fine cellulose particles. The density of the resulting polyurethane finely foamed block was 0.75 g/cm$^3$. A polishing sheet and a polishing pad were prepared in the same manner as in Example 1 and evaluated in polishing. The modulus of elasticity of the resulting polishing sheet was 309 MPa. The measured flatness, polishing speed and scratch of the resulting polishing pad are shown in Table 4.

Example 15

121.8 parts by weight of toluene diisocyanate (2,4-isomer/2,6-isomer=80/20 mixture), 78.6 parts by weight of 4,4'- dicyclohexylmethane diisocyanate, 250 parts by weight of polytetramethylene glycol having a number-average molecular weight of 1000, and 26.5 parts by weight of diethylene glycol were introduced into a vessel and heated at 80° C. for 120 minutes under stirring to give an isocyanate-terminated prepolymer. 138 parts by weight of fine cellulose particles (Avicel, particle diameter of 20 to 100 μm, manufactured by Merck) and 18 parts by weight of a silicon surfactant (SH-192, manufactured by Dow Corning Toray Silicone Co., Ltd.) were introduced into the mixture, mixed and defoamed under reduced pressure at a temperature regulated at 60° C. Then, the mixture was stirred so vigorously as to incorporate bubbles, while 80.1 parts by weight of 3,5-diethyltoluene-2,4-diamine/3,5-diethyltoluene-2,6-diamine mixture (ETHACURE-100™, manufactured by Alubemal Asano) were added thereto. The mixture was stirred for about 1 minute, and the mixed solution was introduced into a pan-type open mold and post-cured for 6 hours in an oven at 110° C., to give a polyurethane finely foamed block (cell diameter 35 μm) containing fine cellulose particles dispersed therein. The density of the polyurethane finely foamed block was 0.75 g/cm³. A polishing sheet and a polishing pad were prepared in the same manner as in Example 1 and evaluated in polishing. The modulus of elasticity of the resulting polishing sheet was 308 MPa. The measured flatness, polishing speed and scratch of the resulting polishing pad are shown in Table 4.

Reference Example 3

A polyurethane finely foamed block (cell diameter 40 μm) was obtained in the same manner as in Example 12 except that 61 parts by weight of polystyrene solid beads (SBX-17, average particle diameter 17 μm, manufactured by Sekisui Chemical Co., Ltd.) were used in place of the cellulose fine particles. The density of the resulting polyurethane finely foamed block was 0.78 g/cm³. A polishing sheet and a polishing pad were prepared in the same manner as in Example 1 and evaluated in polishing. The modulus of elasticity of the resulting polishing sheet was 310 MPa. The measured planarity, polishing speed and scratch of the resulting polishing pad are shown in Table 4.

The result of evaluation of the polishing pad obtained in Comparative Example 1 is also shown in Table 4.

TABLE 4

|  | Storage modulus of elasticity (MPa) | Planarity (nm) | Polishing speed (nm/min) | Scratches (number) | Presence of chlorine atoms in the polyurethane composition |
|---|---|---|---|---|---|
| Example 12 | 305 | 75 | 115 | 30 | No |
| Example 13 | 330 | 60 | 110 | 32 | No |
| Example 14 | 309 | 75 | 115 | 25 | No |
| Example 15 | 308 | 70 | 105 | 26 | No |
| Comparative Example 1 | 268 | 100 | 115 | 90 | Yes |
| Reference Example 3 | 310 | 75 | 115 | 185 | No |

As is evident from Table 4, the polishing pads obtained according to this invention are prepared from chlorine-free materials and are thus capable of thermally recycle (thermal recovery by combustion), achieve both improvement in planarity and reduction in scratches, and the polishing speed is also satisfactory. In Comparative Example 1, on the other hand, the polyurethane contains chlorine atoms and fine hollow spheres, and the evaluation results of planarity and scratch are inferior. In Reference Example 3, the solid beads are not swollen with or dissolved in the aqueous medium, and thus the evaluation result of scratch is inferior, and control of the reaction is more difficult than in Example 12.

Industrial Applicability

The polyurethane composition of this invention is useful as a polishing pad and usable for example in flattening processing materials requiring surface flatness at high level, such as optical materials such as an optical lens and a reflective mirror, a silicon wafer, a glass substrate for a hard disk, an aluminum substrate, and general metal. Accordingly, this invention is highly industrially applicable.

The invention claimed is:

1. A polyurethane composition, comprising:
   3 to 25% by weight based on the total composition of solid and not hollow beads of a particle size of from about 0.1 to 100 μm comprising a hygroscopic organic polymeric material that is selected from the group consisting of one or more of polyphenol having methylol groups, polyvinyl alcohol, polyvinyl pyrrolidone, polyethylene glycol, polyacrylic acid and partially hydrolyzed polyacrylate and is swellable or soluble in an aqueous medium, the beads being dispersed in a microcellular polyurethane foam having microcells and containing a silicon surfactant as a foam regulator,
   wherein the composition has a storage modulus of elasticity at 40° C. of 270 MPa or more as measured by a dynamic viscoelasticity measuring device, and the density of the polyurethane composition is 0.67 to 0.90 g/cm³.

2. The polyurethane composition according to claim 1, wherein the solid and not hollow beads are acrylic beads.

3. The polyurethane composition according to claim 1, wherein the solid and not hollow beads comprise functional groups capable of reacting with polyurethane or starting materials of polyurethane.

4. The polyurethane composition according to claim 3, wherein the solid and not hollow beads are polyphenol and have methylol groups as the functional groups.

5. The polyurethane composition according to claim 1, wherein the polyurethane and the solid and not hollow beads do not contain chlorine.

6. A method of producing a microcellular polyurethane foam by mixing a first component containing an isocyanate group-containing compound and a second component containing an active hydrogen group-containing compound, comprising:
   dispersing solid and not hollow beads of a particle size of from about 0.1 to 100 μm comprising a hygroscopic organic polymeric material selected from the group consisting of one or more of polyphenol having methylol groups, polyvinyl alcohol, polyvinyl pyrrolidone, polyethylene glycol, polyacrylic acid and partially hydrolyzed polyacrylate in the first component or the second component or both;
   adding a silicon nonionic surfactant not having a hydroxyl group in an amount of 0.1 to less than 5% by weight based on the total amount of the first and second components, to the first component or the second component;
   stirring an inert gas with the first component, the second component or both of the first and second components to which a surfactant was added to prepare a cellular dispersing liquid having the inert gas dispersed therein as microcells;

mixing the cellular dispersing liquid with a remainder of the second component, the first component or both the first and second components to form a mixture; and curing the mixture to produce a microcellular polyurethane foam comprising 3 to 25% by weight, based on the total composition, of solid and not hollow beads of a particle size of from about 0.1 to 100 μm comprising a hygroscopic organic polymeric material that is swellable or soluble in an aqueous medium and having a storage modulus of elasticity at 40° C of 270 MPa or more as measured by a dynamic viscoelasticity measuring device and a density of 0.67 to 0.90 g/cm$^3$.

7. The polyurethane composition according to claim 1, wherein the solid and not hollow beads are swellable or soluble in an aqueous medium.

8. The polyurethane composition according to claim 3, wherein the polyurethane and the solid and not hollow beads do not contain chlorine.

9. The polyurethane composition according to claim 4, wherein the polyurethane and the solid and not hollow beads do not contain chlorine.

10. A polishing pad formed from the polyurethane composition according to claim 1.

11. A polishing pad formed from the polyurethane composition according to claim 3.

12. A polishing pad formed from the polyurethane composition according to claim 4.

13. A polishing pad formed from the polyurethane composition according to claim 5.

14. The polyurethane composition according to claim 1, wherein the microcells are formed with a gas selected from the group consisting of nitrogen, oxygen, dry air, an inert gas and mixtures thereof.

\* \* \* \* \*